United States Patent
Wu et al.

(10) Patent No.: US 10,616,480 B2
(45) Date of Patent: Apr. 7, 2020

(54) METHOD, SYSTEM, DEVICE FOR VIDEO DATA TRANSMISSION AND PHOTOGRAPHING APPARATUS (71) Applicant: SZ DJI TECHNOLOGY CO., LTD., Shenzhen (CN)

(72) Inventors: Jun Wu, Shenzhen (CN); Lei Zhu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/047,557

(22) Filed: Jul. 27, 2018

(65) Prior Publication Data
US 2018/0359413 A1 Dec. 13, 2018

Related U.S. Application Data (63) Continuation of application No. PCT/CN2016/072854, filed on Jan. 29, 2016.

(51) Int. Cl.
H04N 5/232 (2006.01)
H04N 5/225 (2006.01)
H04N 7/01 (2006.01)

(52) U.S. Cl.
CPC ....... H04N 5/23232 (2013.01); H04N 5/2257 (2013.01); H04N 5/232 (2013.01); H04N 5/23245 (2013.01); H04N 5/23293 (2013.01); H04N 7/0127 (2013.01)

(58) Field of Classification Search
CPC .. H04N 5/23232; H04N 5/232; H04N 7/0127; H04N 5/2257; H04N 5/23245; H04N 5/23293
See application file for complete search history.

(56) References Cited

U.S. PATENT DOCUMENTS

| 2008/0165895 | A1* | 7/2008 | Lesser | H04L 5/1438 375/316 |
| 2008/0199156 | A1* | 8/2008 | Uchiike | H04N 7/01 386/284 |
| 2012/0236205 | A1 | 9/2012 | Lee et al. | |
| 2014/0078390 | A1* | 3/2014 | Herrick | H04N 7/012 348/441 |

(Continued)

FOREIGN PATENT DOCUMENTS

| CN | 1984304 | 6/2007 |
| CN | 101088289 A | 12/2007 |
| CN | 101453566 A | 6/2009 |

(Continued)

OTHER PUBLICATIONS

The World Intellectual Property Organization (WIPO) International Search Report for PCT/CN2016/072854 Oct. 25, 2016 5 Pages (including translation).

Primary Examiner — Padma Haliyur
(74) Attorney, Agent, or Firm — Anova Law Group, PLLC (57) ABSTRACT A method for video data transmission includes acquiring images based on an acquisition frame rate, performing frame dropping processing on the images to obtain target video image frames, encoding the target video image frames to obtain encoded target video image frames having an encoded output frame rate lower than the acquisition frame rate, and transmitting the encoded target video image frames to a display apparatus.

18 Claims, 7 Drawing Sheets (56) References Cited

U.S. PATENT DOCUMENTS

2015/0365675 A1\* 12/2015 Liang ................ H04N 21/2353
  375/240.25

FOREIGN PATENT DOCUMENTS

| CN | 201251437   | 6/2009  |
| CN | 101778285 A | 7/2010  |
| CN | 102377730   | 3/2012  |
| CN | 103716686 A | 4/2014  |
| CN | 103986517 A | 8/2014  |
| CN | 104166614 A | 11/2014 |

\* cited by examiner

METHOD, SYSTEM, DEVICE FOR VIDEO DATA TRANSMISSION AND PHOTOGRAPHING APPARATUS

CROSS-REFERENCE TO RELATED APPLICATION

This application is a continuation of International Application No. PCT/CN2016/072854, filed on Jan. 29, 2016, the entire contents of which are incorporated herein by reference.

TECHNICAL FIELD

The present disclosure relates to video transmission technologies and, in particular, to a method, a system, a device for video data transmission and a photographing apparatus.

BACKGROUND

A video photographing apparatus such as a camera may be installed on a flight system such as an unmanned aerial vehicle, for obtaining video data. The video data needs to be transmitted in real time to a receiving and display apparatus such as a remote control. During this process, various steps of video image frame acquisition, compression encoding, wireless transmission, wireless reception, compression decoding, display, etc. may be needed. The time needed for completing this process should be as short as possible, so as to reflect a current flight situation in time to avoid accidents.

The video data includes a plurality of successive image frames. The camera acquires the video image at a fixed frame rate and continuously sends it to the remote control for display. The user will see dynamic video pictures. At present, most of the cameras are configured to use the same frame rate as that used at a display side, i.e., the remote control, for acquiring the video image. That is, the camera's acquisition frame rate is equal to the display's display frame rate, thus a delay introduced by acquisition time determines the delay introduced by display time, which eventually results in a larger video image transmission delay.

SUMMARY

The embodiments of the present disclosure provide a method, a system, a device for video data transmission, and a photographing apparatus which reduce an overall transmission delay of video data and increase an instantaneity of a video data transmission by reducing an acquisition time needed to capture video images.

In accordance with the disclosure, there is provided a method for video data transmission including acquiring images based on an acquisition frame rate, performing frame dropping processing on the images to obtain target video image frames, encoding the target video image frames to obtain encoded target video image frames having an encoded output frame rate lower than the acquisition frame rate, and transmitting the encoded target video image frames to a display apparatus.

Also in accordance with the disclosure, there is provided a photographing apparatus including a camera, a processor coupled to the camera, and, and a transmitter coupled to the processor. The processor is configured to control the camera to acquire images based on an acquisition frame rate, perform frame dropping processing on the images to obtain target video image frames, and encode the target video image frames to obtain encoded target video image frames having an encoded output frame rate lower than the acquisition frame rate. The transmitter is configured to transmit the encoded target video image frames to a display apparatus.

Also in accordance with the disclosure, there is provided a device for video data transmission including a photographing apparatus and a display apparatus configured to receive and display a video transmitted from the photographing apparatus. The photographing apparatus includes a camera, a processor coupled to the camera, and a transmitter coupled to the processor. The processor is configured to control the camera to acquire images based on an acquisition frame rate higher than a display frame rate of the display apparatus, perform frame dropping processing on the images to obtain target video image frames, and encode the target video image frames to obtain encoded target video image frames having an encoded output frame rate equal to the display frame rate. The transmitter is configured to transmit the encoded target video image frames to the display apparatus.

BRIEF DESCRIPTION OF DRAWINGS

To describe the technical solutions in embodiments of the present disclosure more clearly, the following briefly introduces the accompanying drawings needed for describing the embodiments. Apparently, the accompanying drawings in the following description illustrate merely some embodiments of the present disclosure, and persons of ordinary skill in the art may still derive other drawings from these accompanying drawings without creative effort.

DESCRIPTION OF EMBODIMENTS

In order to make the objective, the technical solution and advantages of the embodiments of the present disclosure clearer, the technical solution of the present disclosure is hereinafter described in detail with reference to the accompanying drawings. It is evident that the embodiments are only some exemplary embodiments of the present disclosure, and the present disclosure is not limited to such embodiments. Other embodiments that those skilled in the art could obtain based on embodiments of the present disclosure also fall within the scope of the present disclosure.

Before the technical solution of the present disclosure is described in detail, the technical concept of the present disclosure is first set forth here. At present, most of photographing devices installed in aircrafts, such an unmanned aerial vehicles, are configured to acquire image frames at an acquisition frame rate equal to a display frame rate at a display side. Assume that the display frame rate is N, i.e., N video frames are displayed per second. When the acquisition frame rate is equal to the display frame rate, i.e., N frames of image are acquired per second, the time it takes to acquire each video image frame is 1/N second. Take N=30 as an example, the time for acquiring each video image frame is approximately 33 ms, and even if a delay in the transmission to a receiving display terminal is 0, an acquisition delay introduced by the acquisition will be 33 ms. The delay introduced by the time for acquiring image frames determines the delay introduced by the time for display, which also limits a scale of an overall delay of video data. Thus, consistent with the present disclosure, the acquisition frame rate can be increased to be higher than the display frame rate, and hence the delay introduced in the acquisition stage can be reduced, and an instantaneity for image display can be promoted.

The solution of the present disclosure will now be described in detail below in some embodiments with reference to the drawings.

Figure 1:
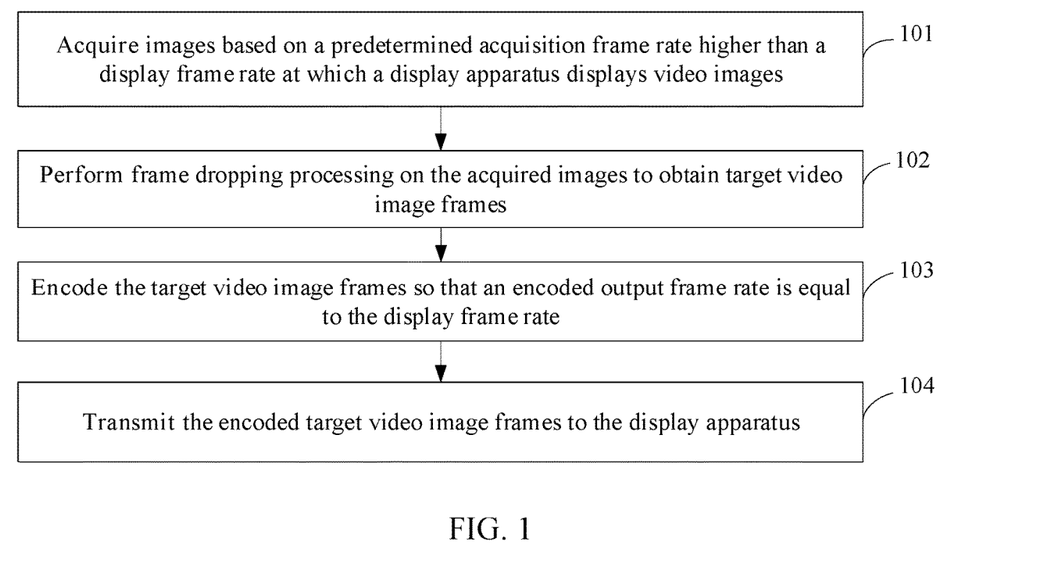
FIG. 1 is a flowchart of a method for video data transmission according to an embodiment of the present disclosure.

FIG. 1 is a flowchart of a method for video data transmission according to an embodiment of the present disclosure. The method can be implemented by a photographing apparatus for transmitting video data to a display apparatus, as described in more detail below.

As shown in FIG. 1, at 101, images are acquired based on a predetermined acquisition frame rate. The acquisition frame rate is higher than a display frame rate at which the display apparatus displays video images.

In some embodiments, the above photographing apparatus can be mounted on an unmanned aerial vehicle having an image transmitting unit or can be mounted on a gimbal or the like having an image unit. In some embodiments, the photographing apparatus itself has an image transmitting function. Taking the unmanned aerial vehicle as an example, the photographing apparatus acquires video images at a certain acquisition frame rate, and transmits the acquired images to the display apparatus on the ground for real time display of the video images.

Here, the acquisition frame rate refers to, e.g., the number of image frames acquired per second by the photographing apparatus, and the display frame rate refers to, e.g., the number of image frames displayed per second by the display apparatus.

At 102, frame dropping processing is performed on the acquired images to obtain target video image frames.

The acquisition frame rate is the number of image frames acquired per second, while in a practical application, a complete segment of video data can include many image frames acquired during a certain time period. In some embodiments, the frame dropping processing is performed sequentially and respectively on the image frames acquired per second. Therefore, the finally obtained target video image frames refer to the video image frames after the frame dropping processing is performed on the images acquired per second.

In some embodiments, equal interval frame dropping, also referred to as equal interval extraction, may be adopted for frame dropping. In some embodiments, image fusion may be adopted for frame dropping. The detailed process of frame dropping will be described in detail below.

At 103, the target video image frames are encoded so that an encoded output frame rate equal to the display frame rate. That is, the target video image frames are encoded to obtain encoded target video image frames having the encoded output frame rate equal to the display frame rate, i.e., lower than the acquisition frame rate.

After the frame dropping is performed on the images acquired per second, the number of image frames per second after the frame dropping is performed should be equal to the display frame rate, i.e., the number of frames displayed per second.

Since encoding is needed after images are acquired and before they are transmitted, that is, acquired images are encoded and then output, the encoded output frame rate should be equal to the display frame rate. That is, for the target video image frames after frame dropping that correspond to one second, the number of image frames output per second after encoding should be equal to the number of image frames displayed per second by the display apparatus.

At 104, the encoded target video image frames are transmitted to the display apparatus.

After the foregoing dropping and encoding are performed, the image frames acquired per second are transmitted to the display apparatus. The display apparatus receives and displays the video images including the target video image frames.

The method for video data transmission provided will be described in more detail using a photographing apparatus mounted on an aircraft, such as an unmanned aerial vehicle, as an example, which can transmit acquired video images to a display apparatus on the ground.

In some embodiments, the photographing apparatus acquires video images at an acquisition frame rate higher than a display frame rate when photographing and acquiring the video data. For example, in the case of a display frame rate of 30 frames per second, the acquisition frame rate can be 120 frames per second, thus the acquisition time for each image frame can be 1/120 second, i.e., about 8.3 ms. Compared to the acquisition frame rate of 30 frames per second, the time saved in the acquisition stage is about: 33 ms−8.3 ms=24.7 ms.

When the video images are acquired at an acquisition frame rate higher than the display frame rate, the number of video image frames acquired per second is large. If the transmission to the display apparatus, such as a remote control, a smartphone terminal, or the like, is performed using the large number of video image frames, it will increase the transmission time at the transmission stage and result in mismatching with the display frame rate. That is, although the display apparatus receives images at a frame rate of 120 frames per second, it may only display the images at a display frame rate of 30 frames per second.

Therefore, in some embodiments, when the acquisition delay is reduced by acquiring the video images at a higher acquisition frame rate, in order to ensure reliable display of the video data at the display apparatus and to reduce the transmission time of the video data from the aircraft to the display apparatus, frame dropping processing is performed on the images acquired per second to obtain target video image frames. Further, the target video image frames are encoded so that an encoded output frame rate is equal to the display frame rate. As such, the number of video image frames that need to be transmitted is reduced, and display reliability is ensured.

The frame dropping processing performed on the acquired images to obtain the target video image frame can be implemented in various manners, as described in more detail below.

In some embodiments, the target video image frames are extracted from the video image frames by way of equal interval extraction.

For example, in the case where the acquisition frame rate is 120 frames per second and the display frame rate is 30 frames per second, in order to make the frame rate transmitted to the display apparatus equal to the display frame rate, the encoded output frame rate needs to be equal to the display frame rate. In other words, certain processing may need to be performed on the 120 image frames acquired per second to reduce the number of target video image frames for image encoding, so as to ensure that the encoded output frame rate is equal to the display frame rate.

In the case of an acquisition frame rate of 120 frames per second and a display frame rate of 30 frames per second, the equal interval extraction can be performed by extracting one frame from every 4 frames, and dropping the other 3 frames, so that the number of target video image frames within one second is 30 frames. If the extraction starts from the first frame, then the extracted video image frames can be the first frame, the fifth frame, the eighth frame, and etc.

Extracting the target video image frames is equivalent to grouping all the video image frames acquired per second to groups each including a certain number of image frames (where the certain number equals the acquisition frame rate divided by the display frame rate), so that the number of groups and the value of display frame rate are equal. For each group, one of the frames is extracted according to a strategy of equal interval extraction, e.g., when the extraction of the target video image frames is performed, the first frame of each group may be extracted, and the other frames may be dropped.

In some embodiments, the acquisition frame rate is set to be an integer multiple of the display frame rate, thereby making the equal interval extraction more convenient and faster. In some embodiments, the acquisition frame rate is not an integer multiple of the display frame rate, the image frames can be similarly grouped, but the number of image frames included in the last group can be different from the number of image frames in any other group. For example, each of the groups except the last group can include four frames, and the last group can include three frames. That is, the remainder of division of the acquisition frame rate by the display frame rate can be set as the number of image frames in the last group. Similarly, the frame dropping processing can be performed in accordance with the strategy of extracting a first frame and dropping the remaining frames in each group.

In some other embodiments, the target video image frames can be obtained by image fusion. That is, a preset number of adjacent video image frames of the video images can be fused to obtain one of the target video image frames.

Similar to the equal interval extraction, in the image fusion approach, the video image frames acquired per second can be divided into groups. The number of groups can be equal to the value of the display frame rate so that the video image frames included in each group can be fused into one image frame for subsequent image encoding processing to ensure that the encoded output frame rate is equal to the display frame rate.

In some embodiments, the image fusion includes but is not limited to fusion by performing weighted average on corresponding pixel data, or image fusion by motion prediction based on image content, or the like.

After the target video image frames for image encoding are extracted from the acquired video image frames, the encoding processing can be performed on the target video image frames and the encoded target video image frames are transmitted to the display apparatus. The display apparatus can decode the received encoded target video image frames, and display the decoded image frames at the display frame rate.

Consistent with the disclosure, an acquisition frame rate higher than the display frame rate is used to acquire the image frames so as to decrease the acquisition delay at the stage of acquiring the video images. In order to ensure normal display of the video data on the display, after the video images are acquired at the higher acquisition frame rate, frame dropping processing is performed on the acquired images so as to cause the encoded output frame rate to be equal to the display frame rate, thus guaranteeing the reliability of display. Therefore, the transmission delay of video data from the aircraft to the display is reduced and the instantaneity of video data transmission is improved by reducing the acquisition delay.

As described above, the acquisition of the video image frames at the acquisition frame rate higher than the display frame rate can reduce the delay introduced at the acquisition stage. In some embodiments, the acquisition frame rate can be determined such that the selected acquisition frame rate is adapted to the processing capability of the photographing apparatus and the actual situation of the flight.

Figure 2:
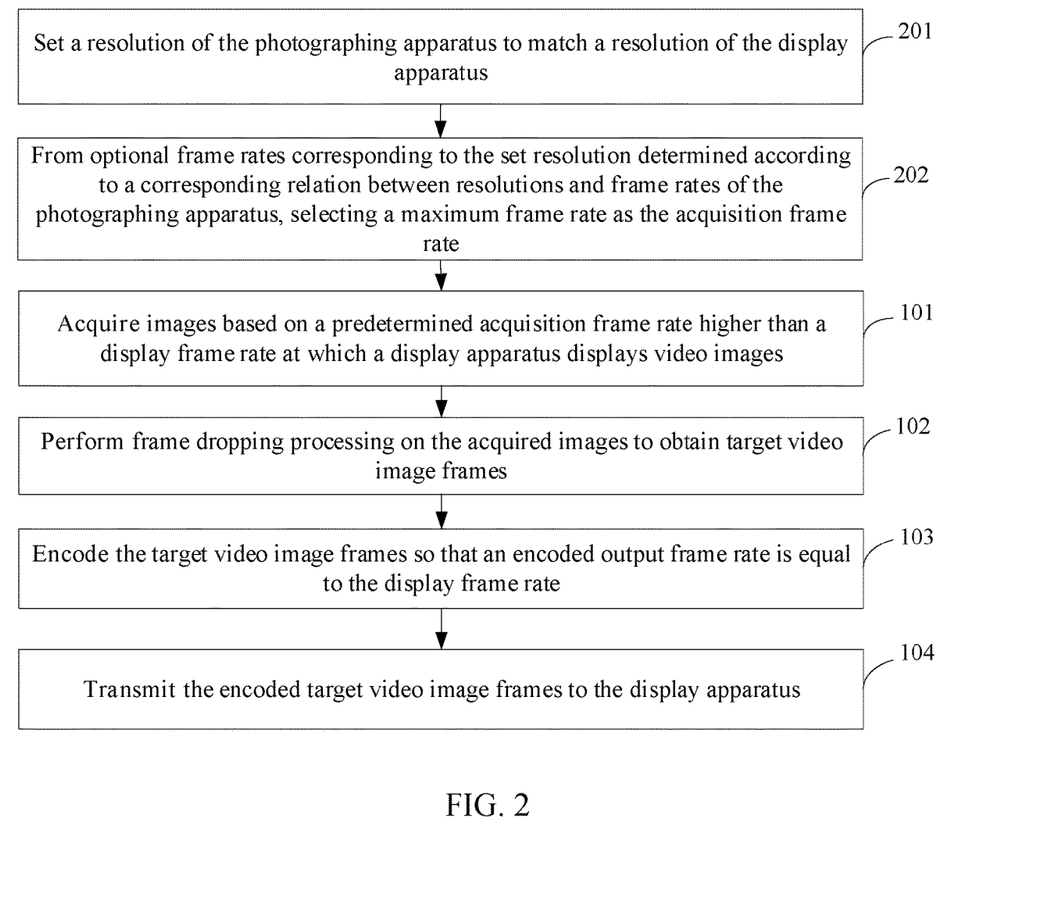
FIG. 2 is a flowchart of a method for video data transmission according to another embodiment of the present disclosure.

FIG. 2 is a flowchart of a method for video data transmission according to an embodiment of the present disclosure. The method shown in FIG. 2 is similar to the method shown in FIG. 1, except that the method shown in FIG. 2 further includes setting a resolution of the photographing apparatus to match a resolution of the display apparatus (201) and selecting a maximum frame rate from optional frame rates corresponding to the set resolution as the acquisition frame rate (202). The optional frame rates are determined according to a corresponding relation between resolutions and frame rates of the photographing apparatus.

Processing capabilities of different apparatuses may vary widely. For the acquiring and display of video images, parameters that are usually involved include the resolution and the frame rate. A photographing apparatus usually has a supported maximum limit for a combination of the resolution and the frame rate. In general for a particular photographing apparatus, the lower the resolution is, the greater frame rate can be supported. Therefore, in the case where the resolution of the photographing apparatus is set to match the resolution of the display apparatus from the viewpoint of reducing the acquisition delay to the greatest extent, the video images can be acquired at an acquisition frame rate equaling a maximum frame rate selected from at least one frame rate corresponding to this resolution determined based on the corresponding relation between resolutions and frame rates of the photographing apparatus.

In some embodiments, setting the resolution of the photographing apparatus to match the resolution of the display apparatus can include setting the resolutions of both to be equal. In some embodiments, the highest resolution (the maximum resolution) supported by the photographing apparatus is lower than the resolution of the display apparatus. In these embodiments, setting the resolution of the photographing apparatus to match the resolution of the display apparatus can include setting the resolution of photographing apparatus to the maximum resolution that can be supported by the photographing apparatus.

Consistent with the disclosure, the acquisition frame rate of the photographing apparatus can be set based on the processing capabilities of the photographing apparatus and the display apparatus. As such, while the instantaneity for the video data transmission is improved reducing an acquisition delay, the applicability can also be improved by taking into consideration the processing capabilities of the apparatuses.

Figure 3:
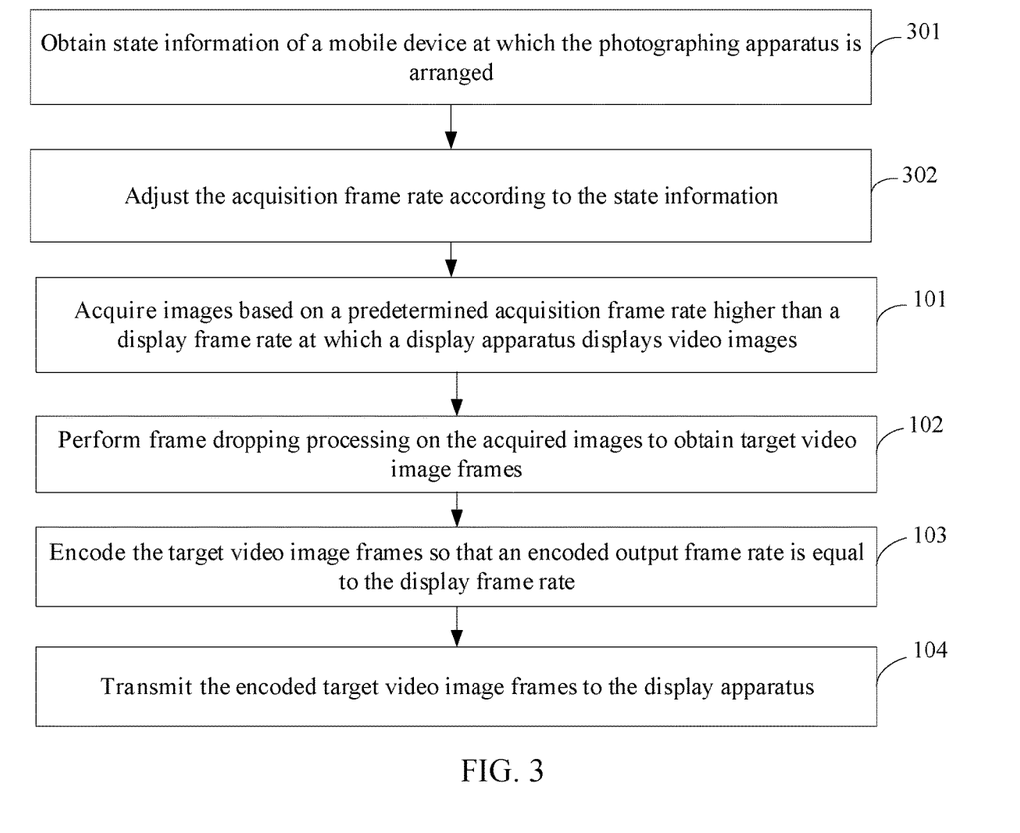
FIG. 3 is a flowchart of a method for video data transmission according to another embodiment of the present disclosure.

FIG. 3 is a flowchart of a method for video data transmission according to another embodiment of the present disclosure. The method shown in FIG. 3 is similar to the method shown in FIG. 1, except that the method shown in FIG. 3 further includes obtaining state information of a movable device at which the photographing apparatus is arranged (301) and adjusting the acquisition frame rate according to the state information of the movable device (302).

The order of the processes described above is not limited to that shown in the figures, and some processes, such as processes 301 and 302 be a process of repeated adjustments. In some embodiments, obtaining the state information (301) and adjusting the acquisition frame rate (302) can be performed before acquiring the images (101), performing the frame dropping processing (102), encoding the target video image frames (103), and transmitting the encoded target video image frames (104).

Hereinafter, the determination and the adjustment of the acquisition frame rate are described taking the scenario where the photographing apparatus is mounted on an aircraft, such as an unmanned aerial vehicle, as an example. In some other embodiments, the photographing apparatus can be mounted on another movable device, such as an unmanned vehicle, an unmanned boat, a gimbal, or the like.

The determination of the acquisition frame rate can be implemented in accordance with a state of the aircraft, which may also be referred to as a flight state of the aircraft. In some embodiments, the flight state information includes, for example, a change in the flying altitude of the aircraft, a change in the angle of turning, a change in the flying speed, and/or the like. These parameters may be acquired using at least one of a barometer, a Global Positioning System (GPS), a visual assist system, or an inertial sensor provided at the aircraft. The inertial sensor may include a sensor (such as a barometer, a GPS, and/or etc.) for detecting parameters which can be configured to acquire the corresponding parameters at a certain time interval to determine the change in the aforementioned flight state.

In some embodiments, adjusting the acquisition frame rate according to the flight state information can includes increasing the acquisition frame rate when the flight state information indicates that the flight scenario of the aircraft changes. In some embodiments, adjusting the acquisition frame rate according to the flight state information can include decreasing or maintaining the acquisition frame rate when the flight state information indicates that the flight scenario of the aircraft does not change.

In some embodiments, the flight scenario of the aircraft can be determined to have changed when an amount of change in the flight state information is greater than a corresponding threshold. The flight scenario of the aircraft can be determined to have not changed when the amount of change in the flight state information is not greater than the corresponding threshold.

In some embodiments, whether the flight scenario of the aircraft has changed is determined by detecting the flight state information. For example, if the change in the flying altitude of the aircraft is greater than a certain threshold, or if the angle of turning of the aircraft is greater than a certain threshold, or if the change in the flight speed is greater than a certain threshold, etc., then it is determined that there is a change in the flight scenario. On the other hand, if none of the above changes is greater than the corresponding threshold, then it is determined that there is no change in the flight scenario.

When the flight scenario changes, the acquisition frame rate can be increased at a certain step-length based on the current acquisition frame rate that is higher than the display frame rate, thereby further reducing the acquisition delay so that the acquired video image frames can be transmitted in real time to the receiving and display apparatus for timely display so as to guide the flight control.

On the other hand, when the flight scenario does not change, the acquisition frame rate can be decreased at a certain step-length or be maintained unchanged based on the current acquisition frame rate that is higher than the display frame rate. The reduced acquisition frame rate should still be greater than the display frame rate, so that the processing load can be reduced with the acquisition delay being reduced.

In some embodiments, when the resolution corresponds to a plurality of optional frame rates, the adjustment scope of the above adjustment may or may not be limited to the plurality of optional frame rates. For example, the embodiments shown in FIGS. 2 and 3 may be combined to include obtaining the state information of the mobile device (301) and adjusting the acquisition frame rate according to the state information (302) can be performed, for example, after the maximum frame rate is selected as the acquisition frame rate (202) or after transmitting the encoded target video image frames.

In some embodiments, the movable device can be another movable device such as an unmanned boat or an unmanned vehicle. Correspondingly, the above state information can be, for example, parameter information such as a travel speed and an angle of turning of the other movable device. Correspondingly, the acquisition frame rate can be increased when the state information indicates that the scenario where the movable device is located changes, and/or the acquisition frame rate can be decreased or maintained when the state information indicates that the scenario in which the movable device is located does not change. As the principle is similar to that of the examples of the aforementioned aircraft, it will not be repeated herein.

Figure 4:
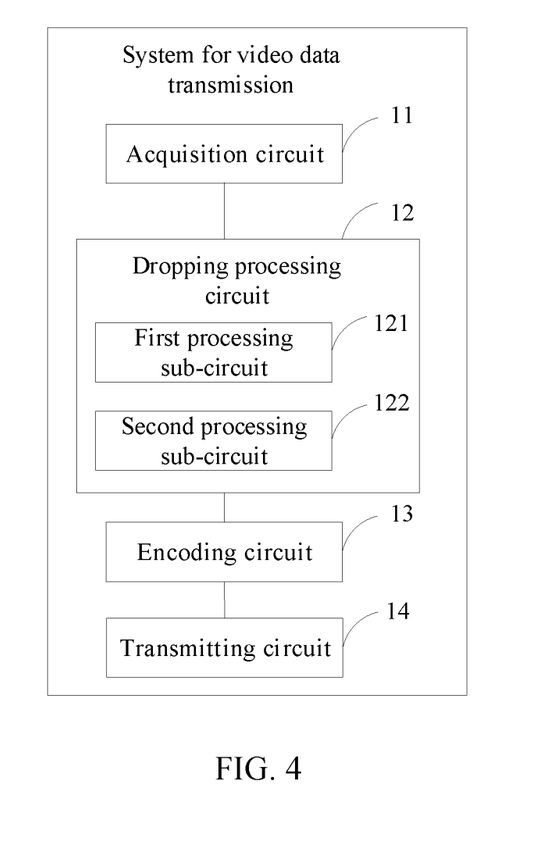
FIG. 4 is a schematic structural diagram of a system for video data transmission according to an embodiment of the present disclosure.

FIG. 4 is a schematic structural diagram of a system for video data transmission according to an embodiment of the present disclosure. The transmission system is configured to transmit the video data to a display apparatus. As shown in FIG. 4, the transmission system includes an acquisition circuit 11, a dropping processing circuit 12, an encoding circuit 13, and a transmitting circuit 14.

The acquisition circuit 11 is configured to acquire images based on a predetermined acquisition frame rate. The acquisition frame rate is higher than a display frame rate at which the display apparatus displays video image.

The dropping processing circuit 12 is configured to perform frame dropping processing on the acquired images to obtain target video image frames The encoding circuit 13 is configured to encode the target video image frames so that an encoded output frame rate is equal to the display frame rate. That is, the encoding circuit 13 can encode the target video image frames to obtain encoded target video image frames having the encoded output frame rate equal to the display frame rate, i.e., lower than the acquisition frame rate.

The transmitting circuit 14 is configured to transmit the encoded target video image frames to the display apparatus.

In some embodiments, as shown in FIG. 4, the dropping processing circuit 12 includes a first processing sub-circuit 121 or a second processing sub-circuit 122.

The first processing sub-circuit 121 is configured to extract the target video image frame from the acquired images by equal interval extraction.

The second processing sub-circuit 122 is configured to fuse a preset number of adjacent video image frames of the acquired images to obtain one of the target video image frames by image fusion.

The system for video data transmission according to the embodiment can be used to implement a method consistent with the disclosure, such as the example method shown in FIG. 1. The principle for implementation and technical effects of the system are similar to those of the method, which will not be repeated here.

Figure 5:
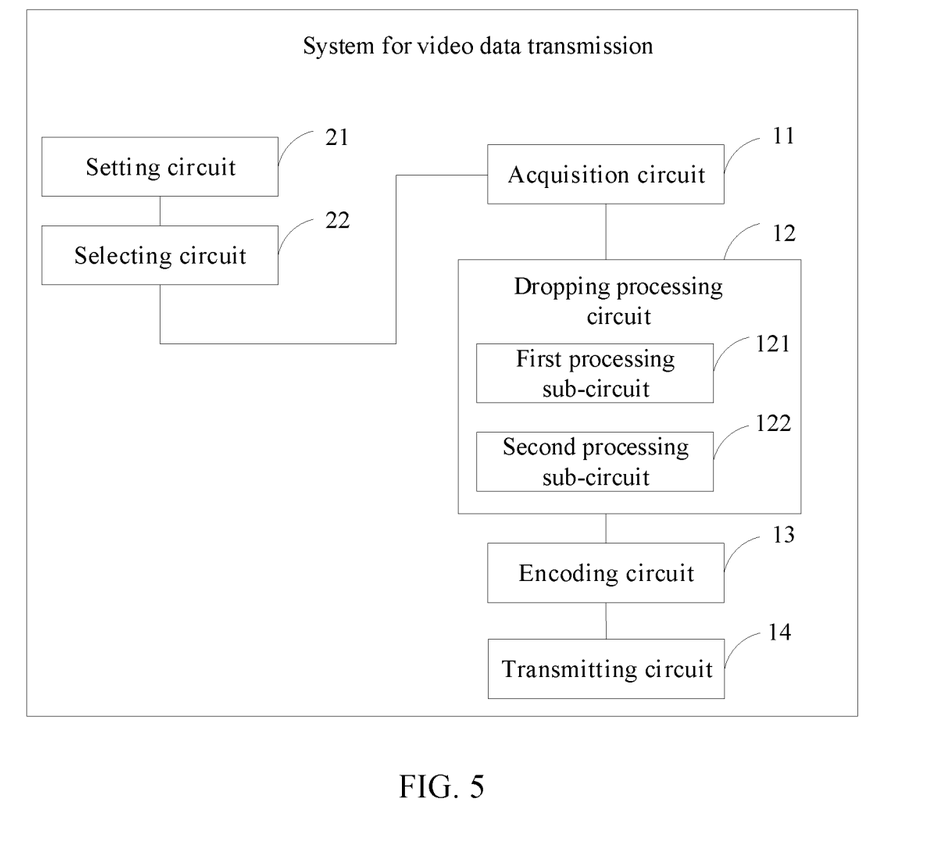
FIG. 5 is a schematic structural diagram of a system for video data transmission according to another embodiment of the present disclosure.

FIG. 5 is a schematic structural diagram of a system for video data transmission according to another embodiment of the present disclosure. The system shown in FIG. 5 is similar to the system shown in FIG. 4, except that the system shown in FIG. 5 further includes a setting circuit 21 and a selecting circuit 22.

The setting circuit 21 is configured to set a resolution of the photographing apparatus to match a resolution of the display apparatus.

The selecting circuit 22 is configured to select a maximum frame rate from optional frame rates corresponding to the set resolution as the acquisition frame rate. The optional frame rates are determined according to a corresponding relation between resolutions and frame rates of the photographing apparatus.

The system for video data transmission according to the embodiment can be used to implement a method consistent with the disclosure, such as the example method shown in FIG. 2. The principle for implementation and technical effects of the system are similar to those of the method, which will not be repeated here.

Figure 6:
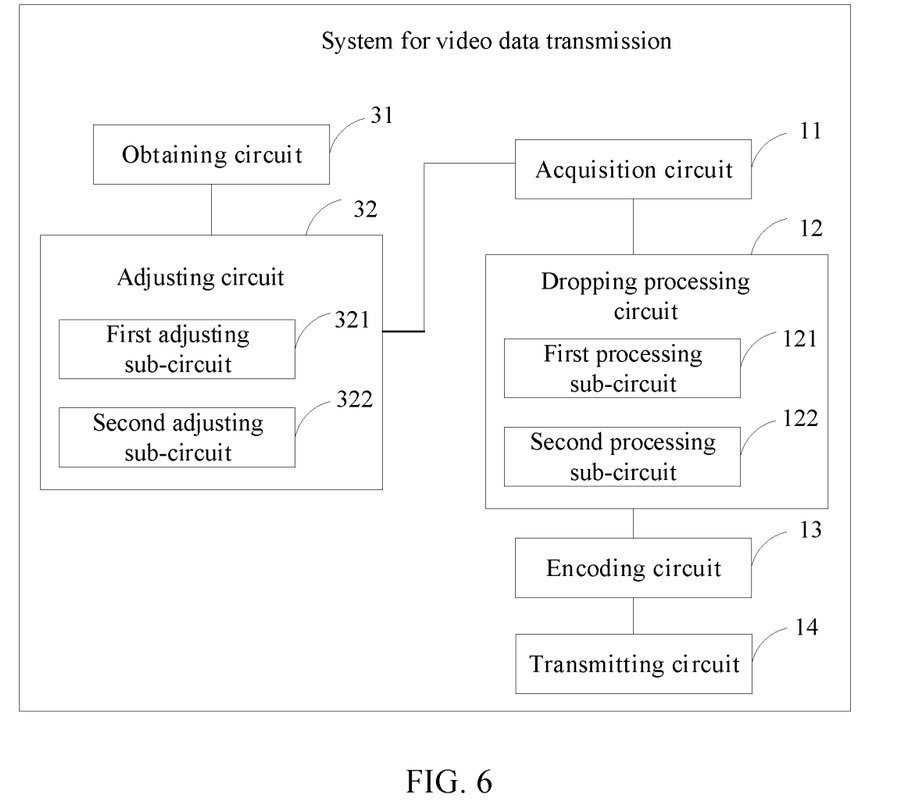
FIG. 6 is a schematic structural diagram of a system for video data transmission according to another embodiment of the present disclosure.

FIG. 6 is a schematic structural diagram of a system for video data transmission according to another embodiment of the present disclosure. The system shown in FIG. 6 is similar to the system shown in FIG. 4 or FIG. 5, except that the system shown in FIG. 6 further includes an obtaining circuit 31 and an adjusting circuit 32.

The obtaining circuit 31 is configured to obtain state information of a movable device at which the photographing apparatus is arranged.

The adjusting circuit 32 is configured to adjust the acquisition frame rate according to the state information.

In some embodiments, as shown in FIG. 6, the adjusting circuit 32 includes a first adjusting sub-circuit 321 and a second adjusting sub-circuit 322.

The first adjusting sub-circuit 321 is configured to increase the acquisition frame rate when the state information indicates that a scenario in which the movable device is located changes.

The second adjusting sub-circuit 322 is configured to decrease or maintain the acquisition frame rate when the state information indicates that the scenario in which the movable device is located does not change.

In some embodiments, the first adjusting sub-circuit 321 is further configured to determine that the scenario in which the movable device is located changes and increase the acquisition frame rate when an amount of change in the state information is greater than a corresponding threshold.

The second adjusting sub-circuit 322 is further configured to determine that the scenario in which the movable device is located does not change and decrease or maintain the acquisition frame rate when the amount of change in the state information is not greater than the corresponding threshold.

In some embodiments, the state information includes at least one of a speed, an angle of turning, or an altitude.

The system for video data transmission according to the embodiment can be used to implement a method consistent with the disclosure, such as the example method shown in FIG. 3. The principle for implementation and technical effects of the system are similar to those of the method, which will not be repeated here.

Figure 7:
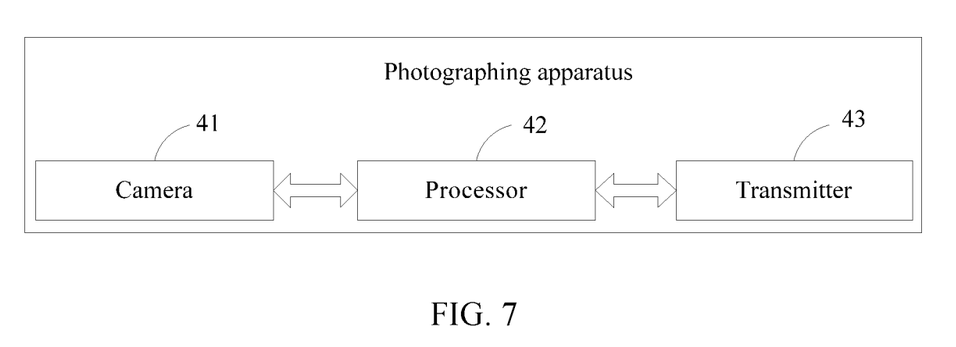
FIG. 7 is a schematic structural diagram of a photographing apparatus according to an embodiment of the present disclosure.

FIG. 7 is a schematic structural diagram of a photographing apparatus according to an embodiment of the present disclosure. As shown in FIG. 7, the photographing apparatus includes a camera 41, a processor 42, and a transmitter 43.

In some embodiments, the processor 42 is configured to control the camera 41 to acquire images based on a predetermined acquisition frame rate higher than a display frame rate at which a display apparatus displays video images.

The processor 42 is further configured to perform frame dropping processing on the acquired images to obtain target video image frames, and encode the target video image frames so that an encoded output frame rate is equal to the display frame rate. That is, the target video image frames are encoded to obtain encoded target video image frames having the encoded output frame rate equal to the display frame rate, i.e., lower than the acquisition frame rate.

The transmitter 43 is configured to transmit the encoded target video image frames to the display apparatus.

In some embodiments, the processor 42 is further configured to extract the target video image frames from the acquired images by equal interval extraction.

In some embodiments, the processor 42 is further configured to fuse a preset number of adjacent video image frames of the acquired images to obtain one of the target video image frames by image fusion.

In some embodiments, the processor 42 is further configured to set a resolution of the photographing apparatus to match a resolution of a receiving and display apparatus, and select a maximum frame rate from optional frame rates corresponding to the resolution as the acquisition frame rate. The optional frame rates are determined according to a corresponding relation between resolutions and frame rates of the photographing apparatus.

In some embodiments, the photographing apparatus is arranged on a movable device, and the processor 42 is further configured to obtain state information of the movable device, and adjust the acquisition frame rate according to the state information.

In some embodiments, the processor 42 is further configured to increase the acquisition frame rate when the state information indicates that a scenario in which the movable device is located changes, and/or decrease or maintain the acquisition frame rate when the state information indicates that the scenario in which the movable device is located does not change.

In some embodiments, the processor 42 is configured to determine that the scenario in which the movable device is located changes when an amount of change in the state information is greater than a corresponding threshold, and/or determine that the scenario in which the movable device is located does not change when the amount of change in the state information is not greater than the corresponding threshold.

In some embodiments, the state information includes at least one of a speed, an angle of turning, or an altitude.

The photographing apparatus according to the embodiment can be used to implement a method consistent with the disclosure, such as one of the example methods shown in FIGS. 1, 2, and 3. The principle for implementation and technical effects of the apparatus are similar to those of the methods, which will not be repeated here.

Figure 8:
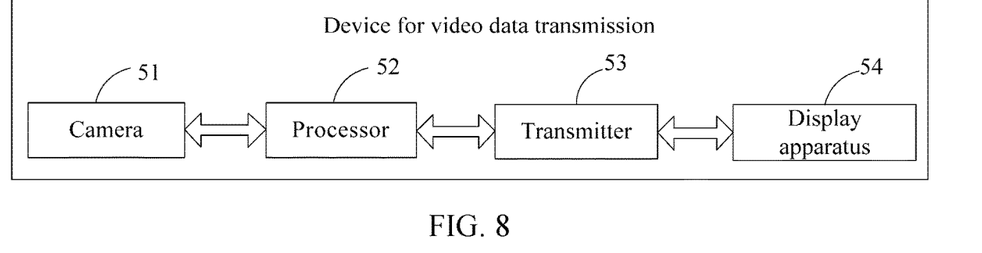
FIG. 8 is a schematic structural diagram of a device for video data transmission according to an embodiment of the present disclosure.

FIG. 8 is a schematic structural diagram of a device for video data transmission according to an embodiment of the present disclosure. As shown in FIG. 8, the device includes a camera 51, a processor 52, a transmitter 53, and a display apparatus 54. The camera 51, the processor 52, and the transmitter 53 can constitute a photographing apparatus.

In some embodiments, the processor 52 is configured to control the camera 51 to acquire images based on a predetermined acquisition frame rate higher than a display frame rate at which a display apparatus displays video images.

The processor 52 is further configured to perform frame dropping processing on the acquired images to obtain target video image frames, and encode the target video image frames so that an encoded output frame rate is equal to the display frame rate. That is, the target video image frames are encoded to obtain encoded target video image frames having the encoded output frame rate equal to the display frame rate, i.e., lower than the acquisition frame rate.

The transmitter 53 is configured to transmit the encoded target video image frames to the display apparatus 54.

The display apparatus 54 is configured to receive and display a video including the target video image frames.

In some embodiments, the processor 52 is further configured to extract the target video image frames from the acquired images by equal interval extraction.

In some embodiments, the processor 52 is further configured to fuse a preset number of adjacent video image frames of the acquired images to obtain the target video image frames by image fusion.

In some embodiments, the processor 52 is further configured to set a resolution of the photographing apparatus to match a resolution of the display apparatus 54, select a maximum frame rate from optional frame rates corresponding to the resolution as the acquisition frame rate. The optional frame rates are determined according to a corresponding relation between resolutions and frame rates of the photographing apparatus.

In some embodiments, the photographing device is arranged on a movable device, and the processor 52 is further configured to obtain state information of the movable device, and adjust the acquisition frame rate according to the state information.

In some embodiments, the processor 52 is further configured to increase the acquisition frame rate when the state information indicates that the scenario in which the movable device is located changes, and/or decrease or maintain the acquisition frame rate when the state information indicates that the scenario in which the movable device is located does not change.

In some embodiments, the processor 52 is configured to determine that the scenario in which the movable device is located changes when an amount of change in the state information is greater than a corresponding threshold, and/or determine that the scenario in which the movable device is located does not change when the amount of change in the state information is not greater than the corresponding threshold.

In some embodiments, the state information includes at least one of a speed, an angle of turning, or an altitude.

In some embodiments, the display apparatus includes a receiver, a processor, a display screen, a memory, etc. The display apparatus can receive video images transmitted by the photographing apparatus through the receiver. The memory can be used to store the received video images. The processor can decode the received video images and control the display screen to display the video images.

As for the execution of processing procedure of each component in the device for video data transmission according to the embodiment, reference can be made to the example embodiments described above in connection with FIGS. 1, 2, and 3. Since the implementation principle and the technical effect thereof are similar, they will not be repeated here.

In the embodiments of the above photographing apparatus, the processor may be, for example, a Central Processing Unit (CPU) or another general purpose processor, a Digital Signal Processor (DSP), an Application Specific Integrated Circuit (ASIC). The general purpose processor may be a microprocessor or any conventional processor. A method consistent with the disclosure may be implemented completely by a hardware processor or by a combination of hardware and software of a processor.

Those skilled in the art understand that the entire or a portion of a method consistent with the disclosure, such as one of the example methods described above can be implemented by related hardware under the instruction of a program stored in a storage medium. When the program is executed, the method is performed. The aforementioned storage medium can include, for example, read-only memory (ROM), a random-access memory (RAM), a flash memory, a hard disk, a solid state hard drive, a magnetic tape, a floppy disk, an optical disc, or any combination thereof.

Finally, it should be noted that the above embodiments are merely for describing the technical solutions of the present disclosure other than limiting the present disclosure. Although the present disclosure is described in detail with reference to the foregoing embodiments, a person of ordinary skill in the art should understand that modifications can be made to the technical solutions described in the present disclosure, or make equivalent replacements to some or all of technical features thereof, without departing from the scope of the technical solutions of the embodiments of the present disclosure.

What is claimed is:

1. A method for video data transmission comprising:
    acquiring images based on an acquisition frame rate by a photographing apparatus;
    performing frame dropping processing on the images to obtain target video image frames;
    encoding the target video image frames to obtain encoded target video image frames having an encoded output frame rate lower than the acquisition frame rate; and
    transmitting the encoded target video image frames to a display apparatus;
    wherein:
        an acquisition resolution of the photographing apparatus is selected to match a display resolution of the display apparatus; and
        a maximum frame rate from optional frame rates corresponding to the selected acquisition resolution of the photographing apparatus is selected as the acquisition frame rate, the optional frame rates being determined according to a corresponding relation between resolutions and frame rates of the photographing apparatus.

2. The method according to claim 1, wherein performing the frame dropping processing on the images to obtain the target video image frames includes:
extracting the target video image frames from the images by equal interval extraction.

3. The method according to claim 1, wherein performing the frame dropping processing on the images to obtain the target video image frame includes:
fusing a preset number of adjacent video image frames of the images to obtain one of the target video image frames by image fusion.

4. The method according to claim 1,
wherein the photographing apparatus is arranged at a movable device,
the method further comprising:
obtaining state information of the movable device; and
adjusting the acquisition frame rate according to the state information.

5. The method according to claim 4, wherein adjusting the acquisition frame rate according to the state information includes:
increasing the acquisition frame rate in response to the state information indicating that a scenario in which the movable device is located changes; or
decreasing or maintaining the acquisition frame rate in response to the state information indicating that the scenario in which the movable device is located does not change.

6. The method according to claim 5, wherein:
determining that the scenario changes includes determining that the scenario changes in response to an amount of change in the state information is greater than a threshold; or
determining that the scenario does not change includes determining that the scenario does not change in response to the amount of change in the state information is not greater than the threshold.

7. The method according to claim 4, wherein the state information includes at least one of a speed, an angle of turning, or an altitude.

8. A photographing apparatus comprising:
a camera;
a processor coupled to the camera and configured to:
control the camera to acquire images based on an acquisition frame rate;
perform frame dropping processing on the images to obtain target video image frames; and
encode the target video image frames to obtain encoded target video image frames having an encoded output frame rate lower than the acquisition frame rate; and
a transmitter coupled to the processor and configured to transmit the encoded target video image frames to a display apparatus;
wherein:
an acquisition resolution of the photographing apparatus is selected to match a display resolution of the display apparatus; and
a maximum frame rate from optional frame rates corresponding to the selected acquisition resolution of the photographing apparatus is selected as the acquisition frame rate, the optional frame rates being determined according to a corresponding relation between resolutions and frame rates of the photographing apparatus.

9. The photographing apparatus according to claim 8, wherein the processor is further configured to:
extract the target video image frames from the images by equal interval extraction.

10. The photographing apparatus according to claim 8, wherein the processor is further configured to:
fuse a preset number of adjacent video image frames of the images to obtain one of the target video image frames by image fusion.

11. The photographing apparatus according to claim 8, wherein:
the photographing apparatus is arranged at a movable device; and
the processor is further configured to:
obtain state information of the movable device; and
adjust the acquisition frame rate according to the state information.

12. The photographing apparatus according to claim 11, wherein the processor is further configured to:
increase the acquisition frame rate in response to the state information indicating that a scenario in which the movable device is located changes; or
decrease or maintain the acquisition frame rate in response to the state information indicating that the scenario in which the movable device is located does not change.

13. The photographing apparatus according to claim 12, wherein the processor is further configured to:
determine that the scenario in which the movable device is located changes in response to an amount of change in the state information being greater than a threshold; or
determine that the scenario in which the movable device is located does not change in response to the amount of change in the state information being not greater than the threshold.

14. The photographing apparatus according to claim 11, wherein the state information includes at least one of a speed, an angle of turning, or an altitude.

15. A device for video data transmission comprising:
a photographing apparatus; and
a display apparatus configured to receive and display a video transmitted from the photographing apparatus;
wherein the photographing apparatus includes:
a camera;
a processor coupled to the camera and configured to:
control the camera to acquire images based on an acquisition frame rate higher than a display frame rate of the display apparatus;
perform frame dropping processing on the images to obtain target video image frames; and
encode the target video image frames to obtain encoded target video image frames having an encoded output frame rate equal to the display frame rate;
a transmitter coupled to the processor and configured to transmit the encoded target video image frames to the display apparatus;
wherein:
an acquisition resolution of the photographing apparatus is selected to match a display resolution of the display apparatus; and
a maximum frame rate from optional frame rates corresponding to the selected acquisition resolution of the photographing apparatus is selected as the acquisition frame rate, the optional frame rates being determined according to a corresponding relation between resolutions and frame rates of the photographing apparatus.

16. The device for video data transmission according to claim 15, wherein the processor is further configured to:
extract the target video image frames from the images by equal interval extraction.

17. The device for video data transmission according to claim 15, wherein the processor is further configured to:
fuse a preset number of adjacent video image frames of the images to obtain one of the target video image frames by image fusion.

18. The method according to claim 7, wherein the state information includes an altitude of the movable device, and the acquisition frame rate of the photographing apparatus is adjusted according to the altitude of the movable device.

* * * * *